US011873851B2

(12) United States Patent
Miraboutalebi et al.

(10) Patent No.: US 11,873,851 B2
(45) Date of Patent: Jan. 16, 2024

(54) EDGE CLIP (71) Applicant: HELLERMANNTYTON GmbH, Tornesch (DE)

(72) Inventors: Farshad Miraboutalebi, Hamburg (DE); Jill Lueders, Tornesch (DE); Fynn Petersen, Tornesch (DE); Sebastian Brill, Tornesch (DE); Artur Hofer, Tornesch (DE); Tobias Lehnert, Tornesch (DE)

(73) Assignee: HELLERMANNTYTON GmbH, Tornesch (DE)

( * ) Notice: Subject to any disclaimer, the term of this patent is extended or adjusted under 35 U.S.C. 154(b) by 0 days.

(21) Appl. No.: 17/817,797

(22) Filed: Aug. 5, 2022

(65) Prior Publication Data
US 2023/0042349 A1 Feb. 9, 2023

(30) Foreign Application Priority Data

Aug. 6, 2021 (EP) .................................... 21190204

(51) Int. Cl.
*F16B 2/00* (2006.01)
*F16B 2/22* (2006.01)

(52) U.S. Cl.
CPC ................ *F16B 2/005* (2013.01); *F16B 2/22* (2013.01)

(58) Field of Classification Search
CPC .. F16B 2/005; F16B 2/22; F16B 5/128; B29C 45/1676
See application file for complete search history.

(56) References Cited

U.S. PATENT DOCUMENTS 4,105,814 A    8/1978    Eggert
4,184,297 A *   1/1980    Casamayor ........... E06B 3/5871
                                                                      D25/123

(Continued)

FOREIGN PATENT DOCUMENTS

EP          3061977        4/2018
EP          3263916        4/2020

(Continued)

OTHER PUBLICATIONS

"Edge Mount Cable Tie Mount", Retrieved at: https://media.digikey.com/pdf/Data%20Sheets/Richco%20Inc%20PDFs/EdgeMountCableTie_CutSheet.pdf—on Jul. 27, 2022, 2 pages.

(Continued)

*Primary Examiner* — Robert Sandy
(74) *Attorney, Agent, or Firm* — Colby Nipper PLLC (57) ABSTRACT

The present disclosure relates to an edge clip for attaching an item to an edge of an object. In an aspect, an edge clip includes a first part with a holding fixture for the item and a second part with two sidewalls and a gap between the two sidewalls. When the edge clip is plugged onto the edge, the edge is introduced into the gap in an insertion direction. The first part and the sidewalls are formed integrally with each other. The first part and at least a part of the sidewalls are formed of a hard component. At least two respective legs protrude into the gap and are formed integrally with each of the sidewalls. The legs of the different sidewalls are offset with respect to each other in the insertion direction and are formed at least in part of a soft component, relative to the hard component.

21 Claims, 4 Drawing Sheets

(56) References Cited

U.S. PATENT DOCUMENTS

| | | |
|---|---|---|
| 4,224,721 A | 9/1980 | Ohlson |
| 4,395,009 A | 7/1983 | Bormke et al. |
| 4,690,412 A * | 9/1987 | Tuckley .................. B60J 10/33 277/921 |
| 5,098,054 A | 3/1992 | Dyer |
| 5,148,576 A | 9/1992 | Dyer |
| 5,157,815 A | 10/1992 | Dyer |
| 5,216,784 A | 6/1993 | Dyer |
| 5,301,917 A | 4/1994 | Dyer |
| 5,505,411 A | 4/1996 | Heaton et al. |
| 5,772,258 A | 6/1998 | Dyer et al. |
| 5,820,083 A | 10/1998 | Geiger |
| 5,937,488 A | 8/1999 | Geiwer |
| 6,112,499 A | 9/2000 | Lyskawa et al. |
| 6,523,790 B2 | 2/2003 | Sentpali et al. |
| 6,736,669 B1 | 5/2004 | Martin |
| 6,991,102 B2 | 1/2006 | Kurmis |
| D543,835 S | 6/2007 | Geiger |
| 7,377,472 B2 | 5/2008 | Brown et al. |
| 7,725,991 B2 | 6/2010 | Lubera et al. |
| 7,753,320 B2 | 7/2010 | Geiger et al. |
| 7,819,365 B2 | 10/2010 | Elsner |
| 7,938,365 B2 | 5/2011 | Guthke et al. |
| 8,141,826 B1 | 3/2012 | Gallardo et al. |
| 8,177,173 B2 | 5/2012 | Spiess |
| 8,313,064 B2 | 11/2012 | Stocker |
| 8,578,571 B2 | 11/2013 | Schmidt |
| D734,654 S | 7/2015 | Geiger et al. |
| 9,328,756 B2 | 5/2016 | Kuhm |
| D760,067 S | 6/2016 | Geiger |
| D784,799 S | 4/2017 | Toll et al. |
| D793,215 S | 8/2017 | Gallion et al. |
| D804,942 S | 12/2017 | Toll et al. |
| D811,869 S | 3/2018 | Gallion et al. |
| D815,939 S | 4/2018 | Geiger et al. |
| D816,471 S | 5/2018 | Gallion et al. |
| D822,476 S | 7/2018 | Haftarski et al. |
| D824,622 S | 7/2018 | Toll et al. |
| D829,090 S | 9/2018 | Toll et al. |
| 10,082,224 B2 | 9/2018 | Otterstrom |
| D829,540 S | 10/2018 | Gallion et al. |
| D840,799 S | 2/2019 | Haftarski et al. |
| 10,208,874 B2 | 2/2019 | Geiger et al. |
| 10,316,991 B2 | 6/2019 | Gallion |
| 10,323,774 B2 | 6/2019 | Van Hulst et al. |
| 10,399,516 B2 | 9/2019 | Chapman |
| 10,428,976 B2 | 10/2019 | Matz |
| 10,903,632 B2 | 1/2021 | Toll et al. |
| D909,843 S | 2/2021 | Van Hulst et al. |
| D909,844 S | 2/2021 | Van Hulst et al. |
| 11,420,571 B1 * | 8/2022 | Spearing ................. F16B 37/02 |
| 2002/0071715 A1 | 6/2002 | Geiger |
| 2002/0084388 A1 | 7/2002 | Geiger |
| 2003/0222184 A1 | 12/2003 | Geiger |
| 2005/0242247 A1 | 11/2005 | Geiger |
| 2007/0007396 A1 | 1/2007 | Wien et al. |
| 2007/0272807 A1 | 11/2007 | Takagaki |
| 2009/0236486 A1 | 9/2009 | Matsuno et al. |
| 2010/0199463 A1 | 8/2010 | Kudo |
| 2011/0303456 A1 | 12/2011 | Blanchard et al. |
| 2012/0217355 A1 | 8/2012 | Geiger et al. |
| 2013/0119208 A1 | 5/2013 | Geiger |
| 2014/0091182 A1 | 4/2014 | Fukumoto |
| 2016/0223100 A1 | 8/2016 | Geiger |
| 2017/0059060 A1 | 3/2017 | Gallion et al. |
| 2017/0227141 A1 | 8/2017 | Toll et al. |
| 2018/0266587 A1 | 9/2018 | Booth et al. |
| 2023/0042090 A1 | 2/2023 | Zhu |

FOREIGN PATENT DOCUMENTS

| | | |
|---|---|---|
| FR | 3074547 | 6/2019 |
| JP | 6546699 | 7/2019 |

OTHER PUBLICATIONS

"Extended European Search Report", EP Application No. 21190204.4, dated Jan. 28, 2022, 9 pages.

"Non-Final Office Action", U.S. Appl. No. 17/817,921, dated Sep. 1, 2023, 13 pages.

* cited by examiner

EDGE CLIP

INCORPORATION BY REFERENCE

This application claims priority to European Patent Application Number EP21190204.4, filed Aug. 6, 2021, the disclosure of which is incorporated by reference in its entirety.

BACKGROUND

In order to attach one or more items to an edge, several types of edge clips are known from the state-of-the-art. An exemplary solution is shown in U.S. Pat. No. 9,328,756B2, which describes a fixing device for cables with at least an edge clip part for mounting the fixing device on an edge of a base part. The edge clip part includes a plug-on gap into which the edge is introduced when plugging the edge clip part onto the edge. There, a metal part is inserted in the edge clip part in order to reinforce the edge clip part. The metal part can include one or several holding tongues, which protrude into the plug-on gap and rest against the edge when the fixing device is mounted. Similar solutions are shown in JP6546699B2, EP3061977B1, U.S. Pat. No. 7,819,365B2, and U.S. Pat. No. 7,725,991B2.

EP3263916B1 shows a device for fastening an elongated object to a rib-shaped support, in which an approximately U-shaped bracket made of a mechanically stable material is used, which bracket has two legs, where on the ends of the legs of the brackets in each case a plate pivotable about a rotational point is arranged, which both extend in a resting position approximately at a right angle to the direction of the legs and which are connected to each other by a bendable connecting element. Then, the two plates, when the bracket is pushed onto the support, can be pivoted by the same about the rotational point in such a manner that in an end position, they each abut on a side of the support against the same, thereby fastening the device on the support.

SUMMARY

Implementations of the present disclosure improve upon the known solutions for attaching items to an edge. One aspect relates to an edge clip for attaching an item to an edge of an object, in particular for attaching a cable tie to an edge, including a first part, which may also be referred to as top part, with a holding fixture for the item, for instance an eye for the cable tie, and a second part, which may be referred to as bottom part, with two sidewalls, forming a gap between the two sidewalls. There, when the edge clip is plugged onto the edge, the edge is introduced into the gap in an insertion direction. The first part and the sidewalls are formed integrally with each other, and the first part and at least a part of the sidewalls are formed of a hard component. The first part can thus be considered as a bridge between the two sidewalls of the second part, resulting in an edge clip with a U-shaped body with the hard component which includes the second part with the two sidewalls and the first part with the holding fixture. This basic design corresponds to the design of known edge clips.

Integrally with each of the sidewalls, at least two respective legs, which may also be referred to as tongues, claws, tabs, or fingers, are formed. These (in total at least four) legs protrude into the gap (from the sidewalls) in order to hold the edge inside the gap once it is introduced into the gap. Thus, the legs are flexible with respect to the sidewalls and can be bent towards the sidewalls when introducing the edge into the gap. Correspondingly, the main extension of the respective legs in a plane perpendicular to the edge, (short for: the main extension plane of the edge to be introduced into the gap), and parallel to the insertion direction can be oriented in an angle of about 45° to the main extension plane of the edge once the edge is held in the gap by the legs, and an angle greater than 45°, for instance of about 90°, when no edge is in the gap.

The legs are formed at least in part of a soft component, meaning that they are formed in part of a soft component or completely of a soft component. The soft component is soft as compared to the hard component. Soft and hard component may be a soft plastic component and/or hard plastic component, respectively. An example hard plastic component may be polyamide with glass fiber, such as PA66-GF15 (15% glass fiber), PA66-GF30 (30% glass fiber), PA6-GF15, or PA6-GF30, or polyamide without glass fiber, such as PA6 or PA66; an example soft plastic component may be a thermoplastic elastomer or thermoplastic polyester-polyurethane. In aspects, when the legs of the different sidewalls are offset with respect to each other in the insertion direction. In particular, the legs of the different sidewalls may be arranged in the insertion direction in an alternating order, that is, in the insertion direction a leg of one sidewall is followed by a leg of the other sidewall, which in its turn is followed by another leg on the first sidewall, and so on. By this a push-force required for pushing the edge into the gap is reduced.

The present disclosure is based on the insight that a combination of soft and hard materials, which is inspired by the shape and surface configuration of human legs makes it possible to provide, via the soft component, enough friction force between the edge and the edge clips since the legs provide, via the hard or soft component, enough spring force to press the parts of the legs that are formed of the soft component against the edge. The respective offset of the legs in the insertion direction reduces the required push force, as the legs are spread serially, one after another, whereas a high pull force is maintained as, once the edge is inserted into the gap and in contact with two or more legs, the different contributions of the different legs to the pull force add up, leading, in the end, to an increased difference of the push and pull force, even for a hard sheet metal where conventional metal claws are of limited use. So, instead of a sharp point or edge of a metal tongue as known in existing edge clips that basically cut into the surface of the edge onto which the edge clip is attached, in the end relying on deforming the edge and thus holding the conventional edge clip in place, the edge clip at hand is held in place on the edge by a friction force that is maintained by the use of a spring force.

This results in the advantage that the edge clip can be produced as one integrated part without the need for a metal clip, which results in an reduced assembly time for the edge clip and a high difference of the push force and the pull force, which is required for pulling the edge clip from the edge after it has been attached to the edge, in particular for an edge made from hard sheet metal. Furthermore, corrosion commonly induced by the contact of the metal clip with the metal edge in conventional designs, and ultimately leading to unsecure attachment in the long term, is avoided. Thus, a more reliable attachment of the edge clip to the edge is achieved.

In an advantageous embodiment, each of the respective legs protrudes, when the edge is not introduced into the gap, into the gap further than a centre plane of the gap, where the centre plane is equally distanced from both of the sidewalls. This gives the advantage that the size of the respective legs, and thus also the contact area of the legs, i.e. the friction which is used to hold the edge within the gap, can be made bigger, thus resulting in a more reliable attachment of the edge clip to the edge.

In another advantageous embodiment, the edge clip is injection-molded. So, it may form one single part which can only be decomposed by destruction. This gives the advantage of a reduced production effort and an increased stability of the edge clip, resulting in an increased reliability of the attachment of the edge clip to the edge.

In yet another advantageous embodiment, each of the respective legs has a flat surface part, the contact area, which is configured to lie against a flat edge such as a metal sheet, introduced into the gap, where the flat surface part in part or completely consists of soft component. Therein, the flat surface part preferably is an end surface of the leg. Such an end surface is a surface that either includes an end of the respective leg in the direction of the flat surface part and/or a surface that is close enough to said end so that a remaining part between the end and the end surface corresponds only to a fraction, for instance less than 20% or less than 10% or less than 5%, of the length of the flat surface part in said direction. This gives the advantage that the friction force of the respective legs is increased, and consequently the reliability of the attachment of the edge clip to the edge is improved. To this end, the respective flat surfaces may feature a surface texture for increasing friction forces. Such a texture may be referred to micro-texture, as it is very small in relation to the size of the respective legs, e.g. smaller by an order of magnitude.

In another advantageous embodiment, each of the respective legs is formed in part of the soft component, which forms a soft part of the respective leg, and in part of the hard component, which forms a hard part of the respective leg. This gives the advantage that the friction force provided by the soft component is increased as an available spring force used to press the soft part of the leg against the edge in the gap can be increased by the hard component, as the hard component is harder than the soft component.

Therein, the hard part of the legs may be formed integrally with the respective sidewall, and a film hinge may be formed between the respective leg and the wall, with a thickness of the hard component at the position of the film hinge being smaller than the thickness of the hard part of the respective leg in another part, in particular any other part of the hard part of the leg. In other words, the film hinge may be the weakest spot or part of the hard part of the legs. The thickness of the hard component may be measured in a given direction in a plane which is perpendicular to the edge and parallel to the insertion direction, in particular the thickness may be measured in the insertion direction. This gives the advantage that the legs are only deformed in a very specific and well defined area, that is, the film hinge, when the edge is introduced into the gap. As a consequence, the soft part of the leg which provides the friction force necessary to hold the edge in the gap can be designed precisely to maximize friction forces and will not be deformed in an undefined way. Consequently, the reliability of the attachment of the edge clip to the edge is further increased.

The soft part of the legs may be closer to an opening of the gap, from which the edge is inserted into the gap in the insertion direction, than the hard part of the respective leg. So when the edge is inserted into the gap, it will encounter the soft part prior to the hard part, provided it encounters the hard part at all. This is making sure the edge is actually in contact with the soft part of the legs once it is inserted into the gap.

Preferably, the soft part includes an anchor which is located in the part of the sidewall formed of the hard component. The anchor may be a part of the soft part which is thicker than the rest of the soft part, and which may be back-injection-molded into the part of the sidewall formed of the hard component. The anchor may be held in place by a narrowing in the hard component, behind which a thicker part, a head of the anchor is positioned. This gives the advantage that the soft part cannot be teared off the hard part of the legs, thus further improving the reliability of the attachment of the edge clip to the edge.

In another advantageous embodiment, exactly three respective legs protruding into the gap are formed integrally with each of the sidewalls. While the edge clip also works reliably with two or four respective legs per sidewall, it turned out that the use of three respective legs per sidewall result in the optimal behaviour. Here, the respective legs are counted in a plane parallel to the insertion direction and perpendicular to the edge to be inserted into the gap, thus exactly three respective legs per sidewall comprise also more respective legs per sidewall, which may be arranged as a series of legs along the edge perpendicular to the insertion direction.

In another advantageous embodiment, the respective legs of each of the respective sidewalls are at least in part arranged behind each other in the insertion direction, meaning they are arranged behind each other in the insertion direction in part or completely behind each other. This ensures that the edge is held in place particularly secure, again contributing to the reliability of the attachment of the edge clip to the edge.

In an advantageous embodiment, the legs have, in a plane parallel to the insertion direction and perpendicular to the edge, an identical profile or cross section. This gives the advantage of a particular homogeneous distribution of friction and spring forces which again increases the reliability of the attachment of the edge clip to the edge.

In another advantageous embodiment, each of the legs has a maximal thickness in a middle area located between a first end area at the tip of the leg, which is distanced from the respective sidewall, and a second end area at a base of the leg, which is adjacent to the respective sidewall. The thickness preferably is measured in the insertion direction or another direction in a plane which perpendicular to the edge and parallel to the insertion direction, when the edge is not introduced into the gap. In particular, the first end area may be part of the flat surface part of the respective legs, where said middle area with a maximal thickness enhances the stability of the flat surface part and thus the reliability of the friction force. The middle area corresponds to the heel of the human leg, which similar to the legs of the edge clip of the present disclosure use a hard component, bones, to press a soft component, the sole of the foot (which corresponds to the flat surface part), onto the area where maximal friction is to be achieved, the ground.

Another aspect relates to a method for injection-molding an edge clip for attaching an item to an edge, the edge clip includes a first part with a holding fixture for the item and a second part with two sidewalls, forming a gap between the two sidewalls, where when the edge clip is plugged onto the edge, the edge is introduced into the gap in an insertion direction. The method includes the method steps of a hard-component injection-molding of the first part and at least a part of the sidewalls using a hard injection-molding component, and a soft-component injection-molding of at least parts of at least two respective legs on each of the sidewall, the legs protruding into the gap. There, the soft component is soft as compared to the hard component.

Advantages and advantageous embodiments of the method correspond to advantages and advantageous embodiments of the edge clip described above.

The features and combinations of features described above, including the general part of the description, as well as the features and combinations of features disclosed in the figure description or the figures alone may not only be used alone or in the described combination, but also with other features or without some of the disclosed features without departing from the scope of the present disclosure. Consequently, embodiments that are not explicitly shown and described by the figures but that can be generated by separately combining the individual features disclosed in the figures are also part of the present disclosure. Therefore, embodiments and combinations of features that do not include all features of an originally formulated independent claim are to be regarded as disclosed. Furthermore, embodiments and combinations of features that differ from or extend beyond the combinations of features described by the dependencies of the claims are to be regarded as disclosed.

BRIEF DESCRIPTION OF THE DRAWINGS

Example embodiments are further described in the following by means of schematic drawings. Therein.

In the different figures the identical or functionally identical elements have the same reference signs.

DETAILED DESCRIPTION

The present disclosure relates to an edge clip for attaching an item to an edge. In aspects, the edge clip is configured for attaching a cable tie to an edge. The edge clip including a first part with a holding fixture for the item, such as an eye for the cable tie, and a second part with two sidewalls, forming a gap between the two sidewalls. When the edge clip is plugged/mounted onto the edge, the edge may be introduced into the gap in an insertion direction. The first part and sidewalls may be formed integrally with each other. The top part and at least a part of the sidewalls may be formed of a hard component.

Figure 1:
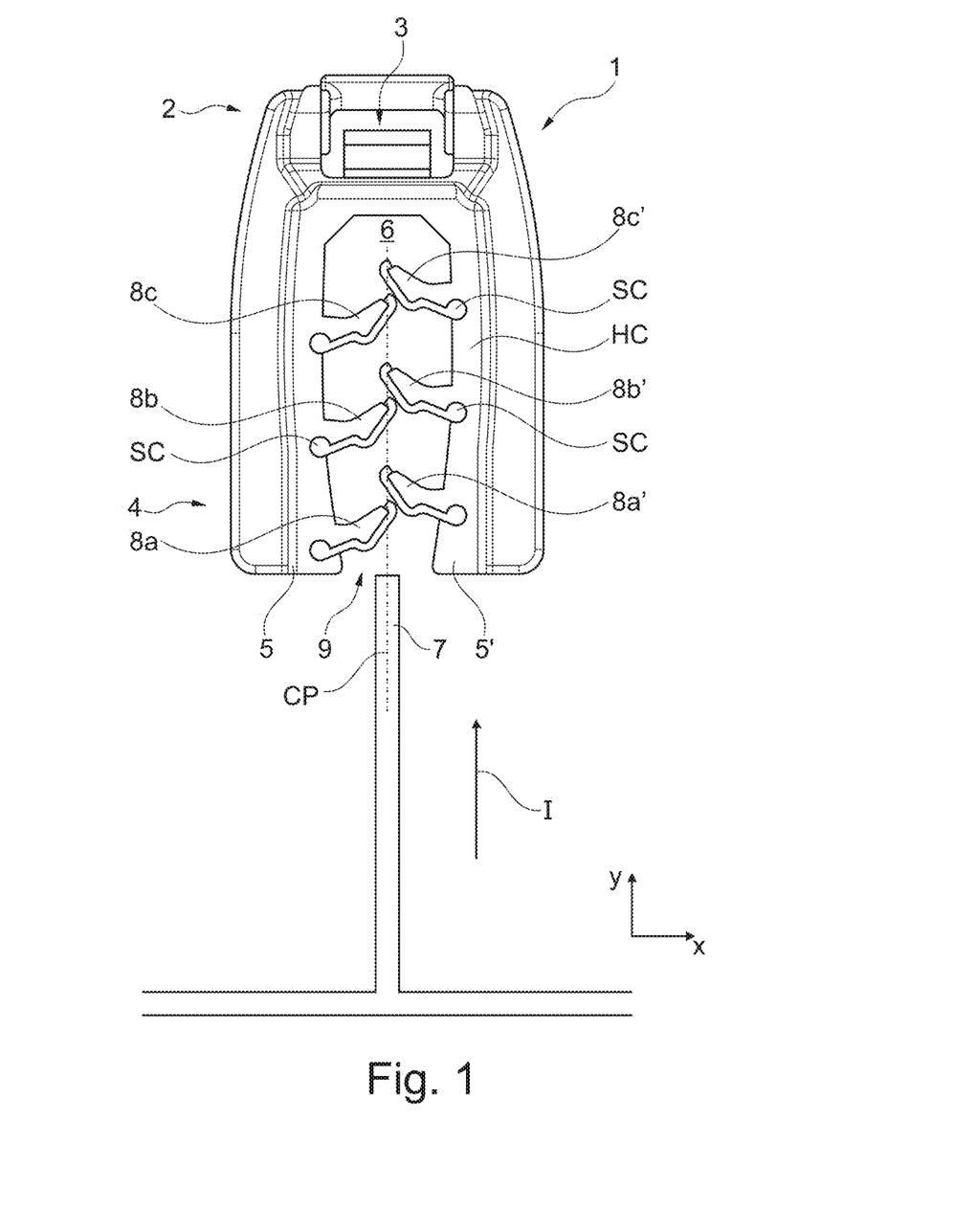
FIG. 1 shows a cross section of an example embodiment of an edge clip before an item is introduced into the gap of the edge clip.

FIG. 1 shows an example embodiment of an edge clip 1 for attaching an item, in the present example a cable tie, to an edge 7 of an object. The edge clip 1 includes a first part 2 with a holding fixture 3, here an eye for a cable tie, and a second part 4 with two sidewalls 5 and 5', forming a gap 6 between the two sidewalls 5 and 5', where when the edge clip 1 is mounted onto the edge 7, the edge 7 is introduced into the gap 6 in an insertion direction I.

Therein, the first part 2 and the sidewalls 5, 5' are formed integrally with each other, and the first part 2 and at least part of the sidewalls 5, 5' are formed of a hard component HC.

Figure 2:
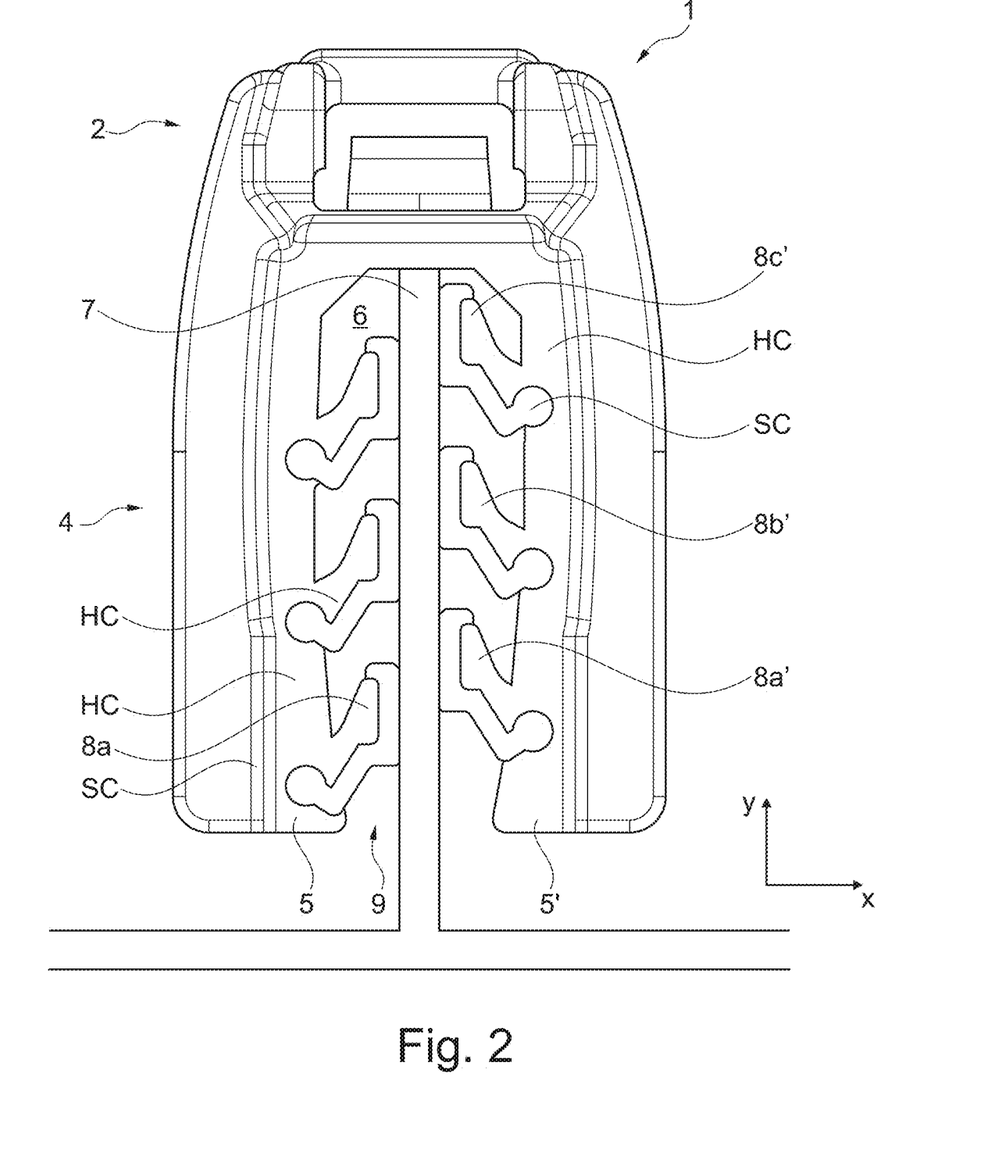
FIG. 2 shows the edge clip of FIG. 1 with the item introduced into the gap.

In addition, at least two, in the present example three respective legs 8a, 8b, 8c, 8a', 8b', 8c' protruding into the gap 6 are formed integrally with the respective sidewalls 5 and 5'. Here, the legs 8a, 8b, 8c of the first sidewall 5 are offset with respect to the legs 8a', 8b', 8c' of the second sidewall 5', and are arranged in an alternating order. The legs 8a-8c' are formed at least in part of a soft component SC which is soft as compared to the hard component HC. In the present example, each of the respective legs 8a to 8c' protrudes into the gap 6 further than a centre plane CP of the gap 6, which is equally distanced from both of the sidewalls 5, 5'. In addition, a soft part 8as (FIG. 3) of the legs, which is the part of the respective leg 8a-8c' made of the soft component SC, in the present example, is closer to an opening 9 of the gap, from which the edge 7 is inserted into the gap 6 in the insertion direction I, than a hard part 8ah (FIG. 3) of the respective legs, which is the part of the respective leg 8a-8c' made of the hard component HC. The use of the hard component HC for the legs 8a-8c' increases a spring force which pushes the legs 8a-8c' back into the neutral position shown in FIG. 1 when moved by an item as shown in FIG. 2. In the present example, the legs 8a-8c' have, in an x-y-plane parallel to the insertion direction and perpendicular to the edge, an identical profile.

When the edge 7 is introduced into the gap 6 in the insertion direction I along the centre plane CP, each of the legs 8a-8c' is bent away from the centre plane CP individually, thereby reducing the push force for inserting the edge 7 into the gap 6.

In FIG. 2, the example embodiment of FIG. 1 is shown with the edge 7 introduced into the gap 6. Due to the spring force associated with the hard component HC the sidewalls 5, 5' and parts of the legs 8a to 8c are made from in the present example, the soft component SC which forms part of the legs 8a-8c' is pressed against the edge 7, resulting in an increased friction between the soft component SC and the edge 7. Correspondingly, with increasing number of legs 8a-8c, the pull force increasingly adds up, resulting in a high difference of push and pull force for the displayed edge clip 1.

Figure 3:
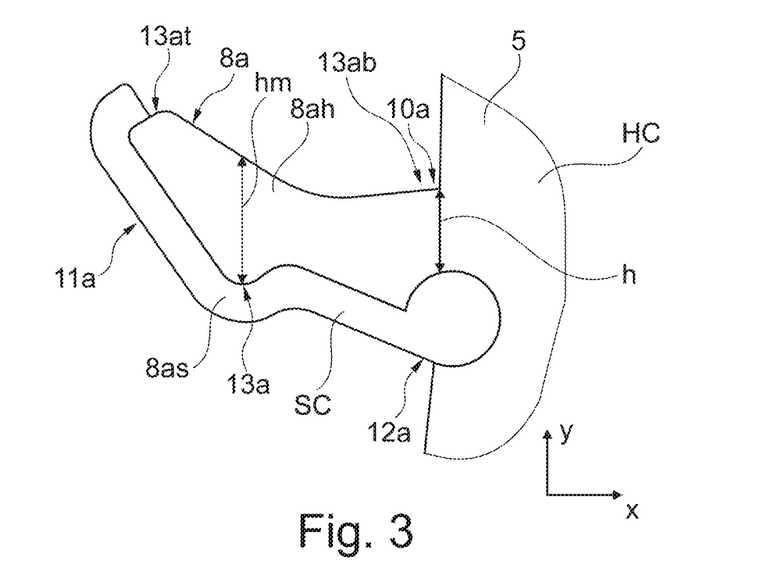
FIG. 3 shows a cross section through an example leg of FIG. 1.

FIG. 3 shows an example leg 8a of FIG. 1. Here, each of the respective legs is formed in part of the soft component SC, which the soft part 8as of the leg 8a is made of, and in part of the hard component HC, which the hard part 8ah of the leg 8a is made of. In the shown example, the hard part 8ah of the legs 8a is formed integrally with a respective sidewall 5, and a film hinge 10a is formed between the leg 8a and the wall 5 with a thickness of the hard component HC measured, in the present example, in the insertion direction I, at the position of the film hinge h being smaller than the thickness of the hard part 8ah of the respective leg in another part. The film hinge 10a provides for the flexibility of the arm 8a when the edge 7 is inserted into the gap 6 and allows the bending of the leg 8a without bending a flat surface part 11a, here formed with the soft part 8as, and which is configured to lie against a flat edge 7 introduced into the gap 6, thus maintaining the flat shape of the flat surface part 11a, obtaining maximal friction force. Furthermore, in the present example, the soft part 8as includes an anchor 12a which is located in the part of the sidewall 5 formed of the hard component HC. In order to optimize the reliability of the attachment of the edge clip to the edge, the legs 8a have a maximal thickness hm in a middle area 13a located between a first end area 13at at a tip of the leg 8a and a second end area 13ab at a base of the leg 8a. In analogy of the human leg or foot, the middle area corresponds to the heel of a foot, where the first end area 13at corresponds to the toes of a human foot, and the second end area 13ab with the hinge 10a corresponds to the knee of the leg.

Figure 4:
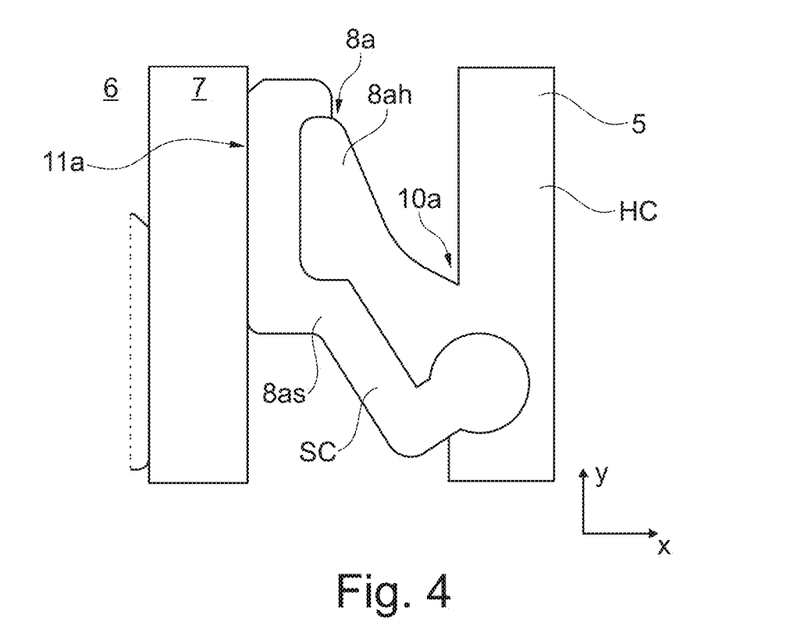
FIG. 4 shows a cross section through an example leg of FIG. 2.

FIG. 4 shows a detail corresponding to the detail of FIG. 3 for the example shown in FIG. 2. The flat surface part 11a, which is configured to lie against the flat edge 7 introduced into the gap 6 maximizes the friction force due to the characteristics of the soft component SC. Note that the leg 8a is deformed only in the area of the hinge 10a.

Figure 5:
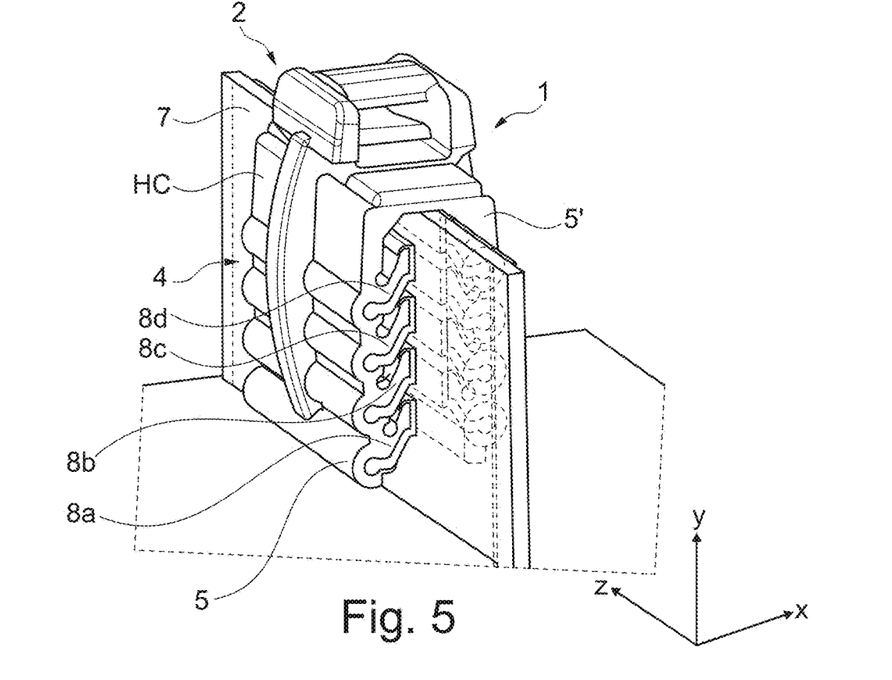
FIG. 5 is a perspective view of another example embodiment of an edge clip with an item introduced into the gap.

FIG. 5 shows another yet similar embodiment of an edge clip 1, which features not three, but four legs 8a, 8b, 8c, 8d on each sidewall 5, 5'. Again, it becomes apparent that the flat surfaces 11a of the respective legs 8a to 8d preferably are arranged parallel to each other, be it in contact with the edge 7, as also shown in FIG. 2, or not in contact with edge 7, as shown in FIG. 1.

Figure 6:
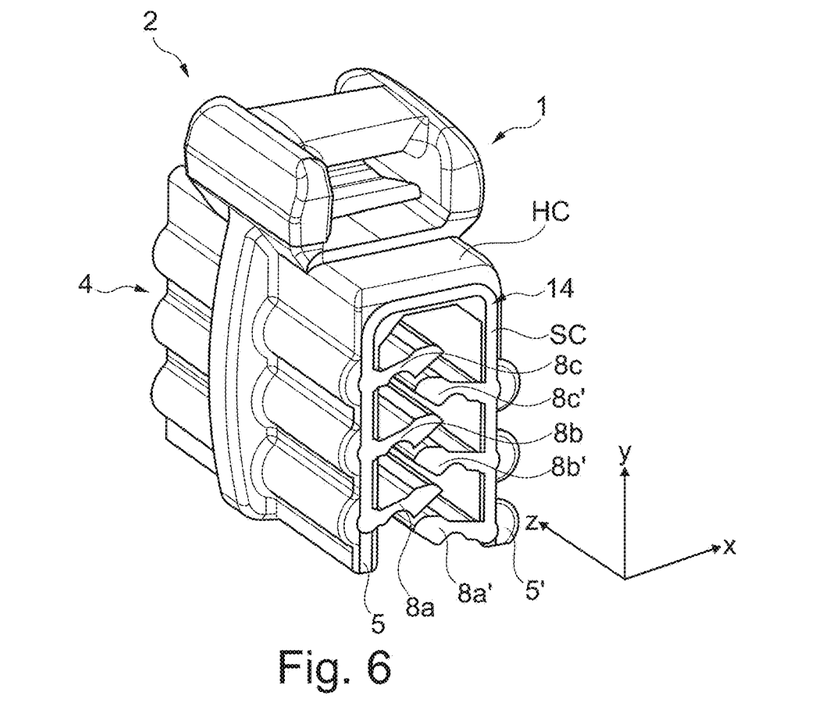
FIG. 6 is a perspective view of yet another example embodiment of an edge clip.

FIG. 6 shows another example embodiment of an edge clip 1, where three legs 8a-8c, 8a'-8c' are disposed at the respective sidewalls 5, 5'. In the shown example, the legs 8a-8c' are entirely made of the soft component, and, in the present example, also connected to each other via an insert 14 extending through a channel that allows the injection-molding of all legs 8a-8c, 8a'-8c' in one single step.

What is claimed is:

1. An edge clip comprising:
   a first part comprising a holding fixture configured for holding an item; and
   a second part comprising two sidewalls, a gap defined between the two sidewalls, and at least two legs protruding into the gap, the legs formed integrally with each of the sidewalls, the edge clip configured for mounting onto an edge of an object with the edge introduced into the gap in an insertion direction, the first part and the sidewalls formed integrally with each other, the first part and at least a part of the sidewalls formed of a hard component, the legs of the sidewalls offset with respect to each other in the insertion direction, the legs formed at least in part of a soft component, the soft component soft as compared to the hard component, and at least one of the legs is formed in part of the soft component and in part of the hard component.

2. The edge clip according to claim 1, wherein at least one of the legs protrudes into the gap farther than a centre plane of the gap when the edge is not introduced into the gap, wherein the centre plane of the gap is equally distanced from both of the sidewalls.

3. The edge clip according to claim 1, wherein the edge clip is injection-molded.

4. The edge clip according to claim 1, wherein at least one of the legs has a flat surface part, the flat surface part configured to lie against a flat edge of the object introduced into the gap.

5. The edge clip according to claim 4, wherein the flat surface part is formed in part of the soft component or the flat surface part is completely formed of the soft component.

6. The edge clip according to claim 1, wherein the soft component forms a soft part of the leg, and wherein the hard component forms a hard part of the leg.

7. The edge clip according to claim 6, wherein the hard part of the leg is formed integrally with the respective sidewall for the leg.

8. The edge clip according to claim 7, wherein a film hinge is formed between the leg and the respective sidewall for the leg, with a thickness of the hard component measured in the insertion direction, at the position of the film hinge being smaller than the thickness of the hard part of the leg in any other part of the hard part of the leg.

9. The edge clip according to claim 8, wherein the soft part of the leg comprises an anchor which is located in the part of the respective sidewall formed of the hard component.

10. The edge clip according to claim 8, wherein the soft part of the leg is closer to an opening of the gap, from which the edge is inserted into the gap in the insertion direction, than the hard part of the leg.

11. The edge clip according to claim 10, wherein the soft part of the leg comprises an anchor which is located in the part of the respective sidewall formed of the hard component.

12. The edge clip according to claim 6, wherein the soft part of the leg is closer to an opening of the gap, from which the edge is inserted into the gap in the insertion direction, than the hard part of the leg.

13. The edge clip according to claim 6, wherein the soft part of the leg comprises an anchor which is located in the part of the sidewall formed of the hard component.

14. The edge clip according to claim 1, wherein the at least two legs protruding into the gap comprise three legs.

15. The edge clip according to claim 1, wherein the legs of each of the respective sidewalls are at least in part arranged behind each other in the insertion direction.

16. The edge clip according to claim 1, wherein the legs have, in a plane parallel to the insertion direction and perpendicular to the edge, an identical profile.

17. The edge clip according to claim 1, wherein at least one of the legs has a maximal thickness in a middle area located between a first end area at a tip of the leg and a second end area at a base of the leg.

18. The edge clip according to claim 17, wherein the maximal thickness is measured in the insertion direction.

19. A method for injection-molding an edge clip for attaching an item to an edge, the edge clip comprising a first part with a holding fixture for the item and a second part with two sidewalls, forming a gap between the two sidewalls, where when the edge clip is mounted onto the edge, the edge is introduced into the gap in an insertion direction, the method comprising of:
   a hard-component injection-molding of the first part and at least a part of the sidewalls using a hard injection-molding component; and
   a soft-component injection-molding of at least parts of at least two respective legs onto each of the sidewalls using a soft injection-molding component, the legs protruding into the gap, the soft component is soft as compared to the hard component, and at least one of the legs is formed in part of the soft component and in part of the hard component.

20. A method comprising:
   forming an injection-molded edge clip configured for attaching an item to an edge, comprising:
      injecting a hard injection-molding component into a mold to form a first part and at least part of a second part, the first part comprising a holding fixture configured to hold the item, and the second part comprising a pair of sidewalls having a gap defined therebetween; and
      injecting a soft injection-molding component into the mold to form at least parts of at least two respective legs on each of the sidewalls, the legs protruding into the gap defined between the sidewalls, the soft injection-molding component softer than the hard injection-molding component, and at least one of the legs is formed in part of the soft component and in part of the hard component.

21. An edge clip comprising:

a first part comprising a holding fixture configured for holding an item; and a second part comprising two sidewalls, a gap defined between the two sidewalls, and at least two legs protruding into the gap, the legs formed integrally with each of the sidewalls, the edge clip configured for mounting onto an edge of an object with the edge introduced into the gap in an insertion direction, the first part and the sidewalls formed integrally with each other, the first part and at least a part of the sidewalls formed of a hard component, the legs of the sidewalls offset with respect to each other in the insertion direction, the legs formed at least in part of a soft component, the soft component soft as compared to the hard component, at least one of the legs protrudes into the gap farther than a centre plane of the gap when the edge is not introduced into the gap, and the centre plane of the gap is equally distanced from both of the sidewalls.

\* \* \* \* \*